3,356,695
METHOD OF ISOLATING STEROIDS
FROM CULTURE FLUIDS
Maria Avksentjevna Romanchuk, Nickolai Nickolaevich Suvorov, Zorja Vasiljevna Kalinkina, Elena Borisovna Trostjanskaja, Anna Semenovna Tevlina, Stanislava Ivanovna Antonova, Lidia Vasiljevna Sokolova, Faina Jakovlevna Leibelman, Zinaida Andreevna Jaroslavtseva, Nina Alexeevna Shchukina, Lev Beniaminovich Shagalov, Tatjana Ivanovna Grinjuk, Olga Konstantinovna Nikiforova, Lidia Alexeevna Krasnova, Ekaterina Grigorjevna Balashova, and Natalja Fedorovna Kovylkina, Moscow, U.S.S.R., assignors to Vsesojuzny Nauchno-Issledovatelsky Khimikofarmatsevtichesky Institute im. S. Ordzhonikidze, Moscow, U.S.S.R.
No Drawing. Filed Jan. 6, 1965, Ser. No. 423,827
4 Claims. (Cl. 260—397.3)

This invention relates to a method of isolating steroids. The known methods of isolating steroids are based on multiple extraction with organic solvents such as chloroform.

The disadvantage of the above-mentioned methods is their costliness due to the high consumption of organic solvents and to the bulky apparatus required.

An object of this invention is to eliminate the above-mentioned disadvantages and to provide a method of isolating steroids which is more economical than the known methods.

The object of the invention is achieved by isolating steroids from culture fluids by adsorption on large-pore cationites. Said cationites are obtained in the process of sulphonating the copolymer of styrene and divinyl.

Such steroids as prednisolone, prednisone, hydrocortisone, metandrostenolone and $\Delta^{1,4}$-androstadiene-3,17-dione can be adsorbed by means of said cationites.

For a better understanding of the invention by those skilled in the art, the following examples are given by way of illustration.

*Example 1*

2,300 ml. of cationite obtained by sulphonating the copolymer of styrene and divinyl are placed in an adsorption column 9.7 cm. in diameter with a capacity of 2,800 ml. Since the initial culture fluid contains prednisolone in the form of fine needles along with dissolved prednisolone, as well as a suspension of proteins, said fluid is preliminarily passed through a layer of 50 g. of cationite placed between two discs on a nutsch filter 25 cm. in diameter. The filtrate is passed through the adsorption column at a rate of 240 ml. per min., after which it is discarded.

Prednisilone is eluted by passing 10–11 liters of technical isopropyl alcohol through the ionite at a rate of 80 ml. per min. The eluate collected is passed through the nutsch filter where it is enriched by dissolving the crystalline prednisolone and desorption of dissolved prednisolone from the cationite. The 11 liters of water-alcohol eluate obtained are filtered through 20 g. of activated charcoal and evaporated under reduced pressure. After distilling off the alcohol the aqueous solution is cooled to 0° C. and the precipitated crystals are filtered off. 48 g. of prednisolone are obtained which meets the specifications of the British Pharmacopoeia, 1958 ed. An additional 9 g. of the product having the same melting point are obtained from the mother liquor after purifying the latter with activated charcoal. Thus, a total of 57 g. of prednisolone is obtained from 70 g. of hydrocortisone subjected to dehydrogenation, i.e. a yield of 81% of theoretical.

*Example 2*

16.1 liters of culture fluid obtained by microbiological hydroxylation of 8 g. of Reichstein's acetate "S," said culture fluid containing 0.044% of the substance epi "F" and having a pH of 3.6, are passed through a column 126 mm. in diameter and 260 mm. high filled with 1,800 ml. of cationite in the hydrogen form obtained in the process of sulphonating the copolymer of styrene and divinyl. Desorption is carried out by eluting 2.5 liters of ethanol at a rate of 10 ml. per min.

The eluate collected by fractions is evaporated under reduced pressure at a temperature of 45° C. until dry. 7.2 g. of the substance epi "F" are obtained, i.e., a yield of 96.5% of theoretical, on the basis of the starting material—Reichstein's acetate "S."

*Example 3*

14.64 liters of culture fluid are passed downwards at a rate of 90 ml. of per min. through an adsorption column 4.2 cm. in diameter filled with 600 ml. of cationite obtained in the process of sulphonating the copolymer of styrene and divinyl. The adsorbed metandrostenolone is eluted with 70% isopropyl alcohol. The eluate, totalling 2 liters is clarified with 5 g. of activated charcoal, filtered and evaporated until crystals begin to form. The precipitate is recrystallized. 2.48 g. of metandrostenolone are obtained, which constitutes 83.5% of the starting material, methyltestosterone.

*Example 4*

600 ml. of swollen cationite obtained in the process of sulphonating the copolymer of styrene and divinyl in the hydrogen form are placed in an adsorption column 44 mm. in diameter having a capacity of 680 ml. 11.8 liters of culture fluid (from 4 g. of cortisone acetate) which has been filtered on a continuous centrifuge are passed downward at a rate of 50–60 ml. per min. through the column of cationite. Then 3 liters of technical isopropyl alcohol are passed through the cationite column at a rate of 30–40 ml. of per min. The eluate collected is stirred with 5 g. of activated charcoal for an hour, filtered off, and evaporated under reduced pressure at a temperature of 40–50° C. The solution is cooled to +2° C. and allowed to stand at this temperature for 2–3 hours. The precipitated crystals are filtered off, placed in a beaker, thoroughly stirred with 10 ml. of 40% isopropyl alcohol and refiltered. Thus 2.35 g. of prednisone are obtained, i.e. a yield of 65.9% of theoretical on the basic of the cortisone acetate. The product meets the specifications of the British Pharmacopoeia, 1958 ed.

*Example 5*

600 ml. of swollen cationite in the sodium form, produced in the process of sulphonating the copolymer of styrene and divinyl, are placed in an absorption column 4.2 cm. in diameter with a capacity of 800 ml. 11.7 liters of culture fluid obtained by a microbiological process from 12 g. of progesterone are freed from protein impurities by passing through a 25 mm. layer of cationite placed between two round pieces of glass cloth on a nutsch filter 20 cm. in diameter. The filtered culture fluid is passed downwards through the column at a rate of 50 ml. per min. After passing through the column the fluid contains no steroids and is discarded. 60% technical isopropyl alcohol is passed at a rate of 60 ml. of per min. through the column, which has been freed from the residual culture fluid. The eluate collected is passed through the nutsch filter where it is enriched by the crystals of $\Delta^{1,4}$-androstadiene-3,17-dione and by desorption of the dissolved steroid from the cationite filter. 3.2 liters of water-alcohol eluate is obtained and stirred with 5 g. of activated charcoal for an hour, and then filtered and evaporated under reduced pressure. After distilling off the alcohol, the aqueous solution is cooled to +2° C., and the crystalline precipitate is filtered off. The mother liquor is extracted with dichloroethane in which the crystalline precipitate is then dissolved. To remove β-naphthol the dichloroethane solution is washed twice with 1% sodium hydroxide solution and then with water to a neutral reaction, after which it is evaporated under reduced pressure to dryness. The residue is thoroughly dried and triturated with 16 ml. of ether. The crystals which form on cooling are filtered off, washed 3 times with 5 ml. of cold ether, and dried in vacuum at 50° C. 8.48 g. of $\Delta^{1,4}$-androstadiene-3,17-dione are obtained; melting point 138–139° C.; $[\alpha]_D^{20}=+115°$ (in chloroform). The yield is 78.12% of theoretical (on the basis of the initial progesterone).

*Example 6*

13.4 liters of culture fluid obtained from 8 g. of Reichstein's acetate "S," which contains a mixture of hydrocortisone and the substance epi "F" are passed at a rate of 50 ml. per min. through a column 7.4 cm. in diameter filled with 900 ml. of cationite obtained in the process of sulphonating the copolymer of styrene and divinyl. After passing through the column, the fluid contains only 0.1 g. of steroids and is discarded. The steroid mixture is desorbed from the cationite with 82% technical isopropyl alcohol at a rate of 30 ml. per min.

The 4 liters of water-alcohol elute are filtered through 10 g. of activated charcoal and evaporated under reduced pressure at a temperature of 40° C. The crystals which form on cooling are filtered off.

Chloroform is added to the mother liquor obtained until crystals of the adduct form, which are added to the main product. Recrystallization gives 2.6 g. of hydrocortisone which meets the specifications of the British Pharmacopoeia, 1958 ed., i.e. a yield of 34.5% of the starting material—Reichstein's acetate "S."

It should be noted that the present invention gives a great economic effect due to the complete elimination of extraction with an organic solvent, the simplification of the apparatus for isolating substances, and in a number of cases, the obviation of the necessity of purifying the product by recrystallization from an organic solvent.

Although this invention has been described in a preferred embodiment it will be understood that there may be changes and modifications without departing from the spirit and scope of the invention. These changes and modifications are to be understood as falling within the spirit and scope of the invention and the appended claims.

What we claim is:

1. A method of isolating steroids from culture fluids, said method comprising directly introducing a culture fluid, containing a steroid to be separated, into an ion exchange column containing cation exchange resin such that the steroids are separated from the culture fluid by adsorption on the ion exchange resin, and desorbing the steroid from the resin with an organic solvent.

2. A method as claimed in claim 1 wherein said steroid is selected from the group consisting of the pregnane series and the androstane series.

3. A method as claimed in claim 1 wherein said resin is a sulphonated polymer of divinyl styrene.

4. A method as claimed in claim 1 wherein said steroid is epi "F," prednisolone, $\Delta^{1,4}$-androstadiene-3,17-dione, prednisone, hydrocortisone or metandrostenolone.

References Cited

UNITED STATES PATENTS

| | | | |
|---|---|---|---|
| 3,037,915 | 6/1962 | Takeda et al. | 195—51 |
| 3,316,282 | 4/1967 | Ivashkiv | 260—397.45 |

ELBERT L. ROBERTS, *Primary Examiner.*